United States Patent [19]

Elonen et al.

[11] Patent Number: 5,324,166

[45] Date of Patent: Jun. 28, 1994

[54] APPARATUS AND METHOD FOR PUMPING A LIQUID

[75] Inventors: Jorma Elonen, Jamsankoski; Kaj Henricson, Kotka; Heikki Manninen, Ummeljoki, all of Finland

[73] Assignee: A. Ahlstrom / A Finnish Corporation, Noormarkku, Finland

[21] Appl. No.: 737,225

[22] Filed: Jul. 29, 1991

[30] Foreign Application Priority Data

Aug. 14, 1990 [FI] Finland ............................. 904004

[51] Int. Cl.⁵ ............................................ F04D 29/70
[52] U.S. Cl. ........................... 415/169.1; 415/213.1; 55/203
[58] Field of Search .................. 415/169.1, 213.1; 417/40; 162/190, 264; 55/203

[56] References Cited

U.S. PATENT DOCUMENTS

| | | | |
|---|---|---|---|
| 976,340 | 11/1910 | Blair | 415/213.1 |
| 1,529,106 | 3/1925 | Anderson | 415/213.1 |
| 2,036,713 | 4/1936 | McBeth | 415/169.1 |
| 2,461,925 | 2/1949 | Rupp . | |
| 2,627,817 | 2/1953 | Mann et al. . | |
| 3,775,026 | 11/1973 | Hewlings | 417/36 |
| 4,273,562 | 6/1981 | Niskanen | 415/169.1 |
| 4,365,977 | 12/1982 | Egbert | 55/203 |
| 4,653,978 | 3/1987 | Eberhardt et al. | 415/26 |
| 4,776,758 | 10/1988 | Gullichsen . | |
| 4,781,529 | 11/1988 | Rose | 415/169.1 |
| 4,921,400 | 5/1990 | Niskanen | 415/169.1 |
| 4,936,744 | 6/1990 | Dosch et al. | 415/169.1 |
| 5,141,535 | 8/1992 | Elonen et al. | 415/169.1 |

FOREIGN PATENT DOCUMENTS 0395236 10/1990 European Pat. Off. .
1118343 7/1968 United Kingdom .

Primary Examiner—Edward K. Look
Assistant Examiner—James A. Larson
Attorney, Agent, or Firm—Cohen, Pontani, Lieberman & Pavane

[57] ABSTRACT

A system for simultaneously degassing and pumping a liquid from a source includes in combination a gaseous liquid source having a feed inlet for the liquid so as to form a liquid surface at a first level; a degassing pump for simultaneously degassing and pumping the liquid, the degassing pump includes a housing with a liquid inlet, and an outlet for a substantially gas-free flow and a gas discharge opening, a suction conduit having a first end connected to the pump inlet and a second outlet immersed in the liquid below the liquid surface. Preferably, the suction conduit is immersed in the liquid flow below the liquid surface and below the feed inlet.

8 Claims, 2 Drawing Sheets

APPARATUS AND METHOD FOR PUMPING A LIQUID

FIELD OF THE INVENTION

The present invention relates generally to pumping of a liquid from a level of lower pressure to a level of relatively higher pressure such as, for example, from an open channel flow at negative static head.

BACKGROUND OF THE INVENTION

On open channel flow is the flow of liquids in a channel whose geometry is such that one liquid surface is free of solid boundaries. Typically, such flows occur in channels, pipes, that are not flowing full, pools, tanks, or the like. In industrial applications, open channel flows are encountered in form of process effluent streams in thermal exchange as well as removal/delivery applications.

Traditionally, emersion pumps have been utilized for pumping liquid from a lower level (lower pressure) to a relatively higher level (higher pressure). However, an open channel flow is subject to air entrainment due to secondary circulation and, particularly in cases where the specific flow channel functions as a manifold for receiving several partial or side flows. Air entrained in the open channel flow is thus present as free and combined air, which collectively tends to cause substantial pumping problems because the presence of air or gas in the pumped liquid or suspension rapidly leads to pump cavitation, i.e. the combination of air released and vaporization caused by low pressure induced in the liquid, as well as to disturbances of subsequent processes to which the liquid or suspension containing the entrained air is directed. Apparent disadvantages of a pump immersed into an open channel flow include the tendency of the pump to become clogged by solid or semi-solid matter, as well as problems associated with the maintenance of such pumps.

It is thus an object of the present invention to overcome the above mentioned disadvantages and to provide an arrangement or system for pumping liquids from flows at negative static head, i.e. the pumping apparatus is located above the free surface of the liquid supply.

SUMMARY OF THE INVENTION

The present invention provides a system for pumping liquids from a lower level to a relatively higher level such as, for example, from an open channel flow without immersing the pump itself into the liquid flow by utilizing as a means for pumping said liquid a degassing pump, i.e. a pump including means for simultaneously pumping and degassing pumped liquid. As mentioned, the degassing pump in the system of the present invention is not immersed into the source of the medium to be pumped but is located at an elevated level above the liquid surface. In other words, the system of the present invention operates at a negative static head as there is a vertical difference between the entry port into the pumping and degassing apparatus and the liquid supply. The use of a degassing pump results not only in trouble-free pumping but also permits the removal of any gas by and during the pumping operation without any additional expedient.

As used throughout this specification (including claims), the word "gas" is intended to include any and all gases, whether free, combined or dissolved, including by way of example only air; and the expression "deaerating pump" or "degassing pump" is intended to mean a centrifugal pump capable of separating gas (as above defined) from the working liquid passing through the pump, which includes a gas channel for conveying separated gas from a zone upstream of or in front of the impeller to a zone downstream of or in back of the impeller, said pump further including a vent to permit the removal of said separated gas from the pump. Examples of suitable deaerating pumps are a pump sold as a degassing MC ® pump by the assignee of the present invention, A. Ahlstrom Corporation, another pump sold by said assignee under the trademark AHL-STAR ® equipped with AIRSEP ® degassing. Also as used herein, the term "liquid" is intended not only to embrace liquids as conventionally defined but also slurries and suspensions which flow like liquids or are caused to flow through a deaerating pump like a liquid.

It is also an object of the present invention is to provide a method and system for pumping a flow of liquid from a safe-all tray or a water seal of a vacuum system of a white water circulation system of a paper making machine. Water seals and safe-all trays are located underneath the paper making machine in floor recesses for collecting white water containing considerable amounts of air. Heretofore, large white water pools had to be constructed alongside these open channel flows in order to assure the required approach pressure at the suction side of the pump. In accordance with the present invention, the pumps can be placed on a higher level above the safe-all tray or the water seal.

Accordingly, the present invention provides a system for simultaneously degassing and pumping a gas containing liquid which comprises in combination a source for said gas containing liquid having a feed inlet for said liquid so as to form a liquid surface at a first pressure level; means at a second relatively higher pressure level for simultaneously degassing and pumping said liquid, said pumping means consisting of a degassing pump comprising a housing with a liquid inlet, an outlet for a substantially gas-free flow and a gas discharge opening, a suction conduit having a first end connected to said pump inlet and a second end immersed in said liquid below said liquid surface and, preferably, below said feed inlet.

BRIEF DESCRIPTION OF THE DRAWING

The invention is described in the following by describing a preferred embodiment thereof with reference to the accompanying drawing in which.

DETAILED DESCRIPTION OF THE PRESENTLY PREFERRED EMBODIMENT

Figure 1:
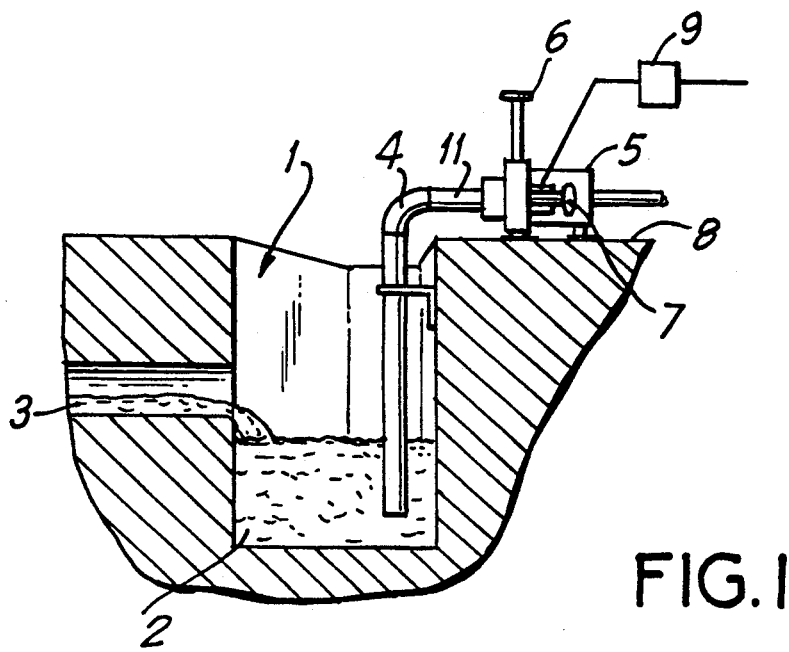
FIG. 1 illustrates a schematic view of a system for pumping liquid from a source of liquid according to the present invention.

FIG. 1 illustrates a cross-section of a source for a gas containing liquid such as, for example, an open channel 1 and a lateral feed conduit 3 through which a liquid flow 2 enters into channel 1 to combine with main channel flow 2 therein.

According to the present invention pump 5 is placed on a level 8 above the level or surface of the liquid. Pump 5 is equipped with means for simultaneously pumping and degassing the liquid from the open channel flow. As suitable pumps may be utilized an AHL-STAR ® pump with its AIRSEP ® features made commercially available by assignee herein. Equally effective is a centrifugal pump with either an external or internal vacuum pump such as a NASH ® pump as is further described below. Pump 5 has an inlet 11 which is connected to conduit 4 which is emerged into the source of the gaseous liquid preferably below liquid inlet 3. Under normal circumstances pumping a gas containing liquid from open channel 1 through suction conduit 4 cannot be performed successfully as air tends to be separated by the centrifugal action of the pump impeller and tends to collect in front of the impeller leading to cavitation and eventually causing the pumping operation to come to a standstill due to the presence of air. This is effectively avoided by providing pump 5 with means for degassing the pumped liquid.

As mentioned, pump 5 is placed on a dry level 8 above the level of the liquid to be pumped, where it is supported e.g. by support legs bolted on a suitable foundation. Suction conduit 4 of pump 5 is directed downward into the liquid 2 so that its free end extends into the liquid flow 2 preferably below the level of the feed conduit 3. According to the preferred embodiment of the invention pump 5 is remote from channel 1 and is placed alongside channel 1 so that pump 5 is situated essentially above the lower end of the suction conduit 4. As mentioned, it is advantageous that pump 5 is located entirely above the liquid level of the open channel flow.

Figure 2:
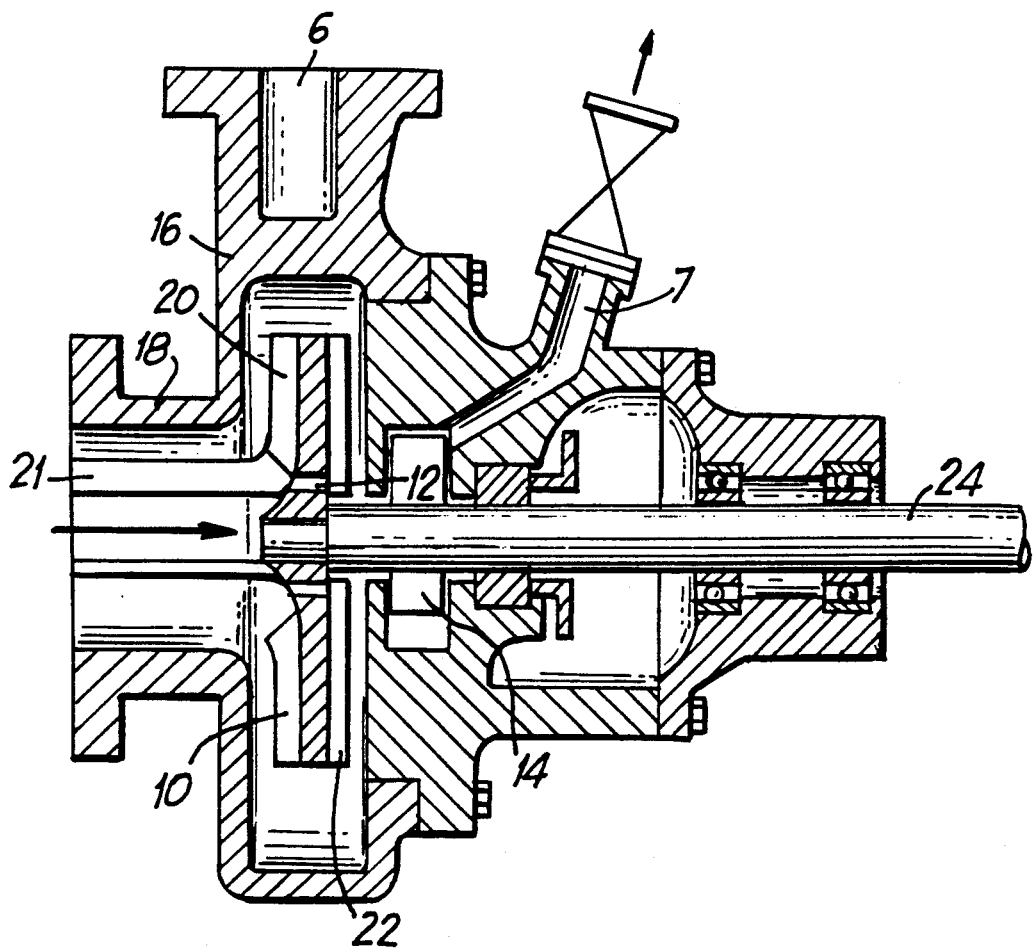
FIG. 2 is a schematic cross-sectional view of a pump for practicing the present invention.

The degassing pump for practicing the method of the present invention is preferably a centrifugal pump as shown in FIG. 2 comprising at its discharge side a first outlet 6 for discharging an essentially gas-free and air-free liquid flow, and a second outlet 7 for the discharge of a gas containing flow. The pump further comprises a housing 16 with an inlet 18 for the liquid or the fiber suspension. Impeller 10 is provided at the front side facing the inlet 18 with pumping vanes 20 and, optionally with fluidizing blades 21, and at the back side with back vanes 22 which assist the separation of gas from the medium to be pumped. For conducting the gas containing flow into the second outlet 7, the impeller 10 of pump 5 includes a central gas passage 12 for permitting the gas which has been collected in front of the impeller to pass to the backside of the impeller from where the gas is then directed into outlet 7 and out of the pump optionally by means of an external vacuum pump 9 (FIG. 1) or internal vacuum pump 14 preferably on the same shaft 24 as impeller 10 (FIG. 2). In general, the gas discharge opening 7 should be connected to an appropriate external vacuum generating system or to an internal vacuum pump specifically when the pressure of the air bubble formed in front of the impeller is so low that it has not enough energy to flow out of the pump on its own.

In practice, suction conduit 4 frequently has a length so that the pressure of the gas bubble formed in front of the pump impeller is lower than the atmospheric pressure. In these cases one of the above discussed methods for assisting the removal of gas from the pump must be utilized.

Figure 3:
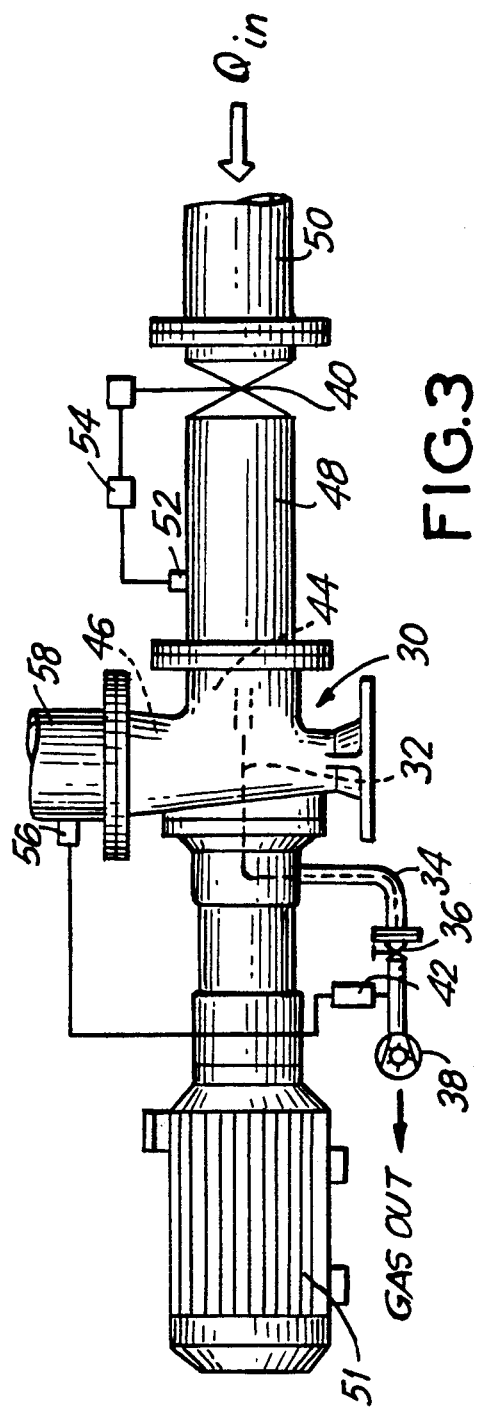
FIG. 3 illustrates a preferred control circuit for a degassing pump for use in the present invention.

As shown in FIG. 3, the deaerating pump for use with the apparatus and method of the present invention preferably comprises a centrifugal pump 30 with a channel 32 within the pump which is connected to an exterior gas discharge pipe 34, and via valve 36 to a suction or vacuum pump 38, which can be, for example, a well-known NASH ®-pump or the deaerating pump is provided with the internal liquid ring pump of FIG. 2. The drawing also schematically illustrates control valves 36,40 for controlling the reduced pressure generated by suction pump 30. The centrifugal pump 30 has, as is known, a motor 51, a suction opening 44 and a pressure opening 46. A suction duct 48 is mounted to the suction opening. The duct 48 is connected by a valve 40 to the inlet pipe 50 for the fiber suspension. The control circuit further comprises a pressure sensor 52 connected to the suction duct 48 and a control unit 54 which is connected to valve 40 to regulate the operation of the valve.

In operation, the fiber suspension is drawn by pump 30 into suction duct 48 through valve 40 from inlet pipe 50. The flow is constricted by valve 40 in such a way that a reduced pressure is generated in the suction duct and in the suction opening 44 of the pump thereby facilitating the separation of gas from the fiber suspension. Hence, the flow is throttled as much as possible short of avoiding boiling thereof thereby maximizing air removal. Pressure sensor 52 and control unit 54 maintain the pressure in the suction duct sufficiently high to prevent the suspension from boiling due to the reduced pressure. In this manner the amount of gas separated from the suspension in front of the impeller is as great as possible and the separated gas is discharged from the centrifugal pump 30 via the conventional route. Thus, centrifugal pump 30 is pumping suspension through pressure opening 46 and the gas content of the suspension is considerably lower than that of the suspension in the inlet pipe 50. Control unit 42 and pressure sensor 56 also control the pressure difference between the air bubble created in front of the pump impeller and the pressure in discharge pipe 58 to maintain the pressure differential at the desired level.

Figure 4:
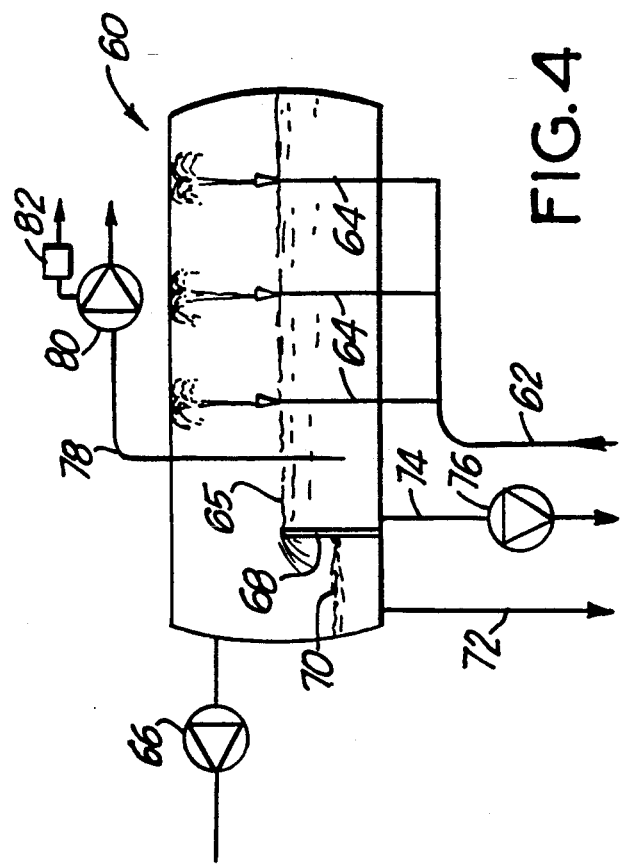
FIG. 4 illustrates another embodiment of the present invention.

FIG. 4 schematically illustrates a further embodiment of the present invention wherein the medium to be pumped, in this case a fiber suspension of the pulp and paper industry, is pumped from a deculator tank 60 which is maintained at an underpressure. In other words, in this embodiment the liquid is also transferred from an area or level of lower pressure to an area or level of higher pressure. FIG. 4 schematically illustrates a deculator tank 60 generally used in the pulp and paper industry within the short circulation of a paper machine for deaerating or degassing the fiber suspension prior to introducing the fiber suspension into the headbox of the paper machine. The fiber suspension is introduced into tank 60 through conduit 62 and distributed to several feed pipes 64 which extend into the tank and above the level 65 of the fiber suspension. The suspension is sprayed through feed pipes 64 over and on top of liquid surface 65 in the tank preferably in a manner so that the spray hits the top of the tank whereby gas contained in the fiber suspension is readily separated therefrom. Negative pressure is applied to the tank 60 by a vacuum pump 66 which also assists in the removal of the gas from the suspension. The level 65 of the fiber suspension within the tank 60 is maintained constant by a partition wall or weir 68 in known manner. The overflow 70 is transferred via conduit 72 to the wire pit (not shown). Deaerated fiber suspension is removed from the bottom of tank 60 through conduit 74 by a degassing pump 76 and fed to the headbox of the paper machine under pressurized conditions. The fiber suspension may also be removed from the tank 60, in accordance with the present invention, through conduit 78 by pump 80 which may have an external source 82 of underpressure or an internal vacuum pump such as a liquid ring pump as described previously herein.

It should be understood that the preferred embodiments and examples described are for illustrative purposes only and are not to be construed as limiting the scope of the present invention which is properly delineated only in the appended claims.

What is claimed is:

1. A system for simultaneously degassing and pumping a gaseous liquid comprising in combination:
   a gaseous liquid source having a feed inlet for said liquid so as to form in said source a liquid surface at a first level;
   means at a second relatively higher level for simultaneously degassing and pumping said liquid, said pumping and degassing means consisting of a centrifugal degassing pump, comprising a housing with a liquid flow inlet, means for maintaining a predetermined pressure at said liquid flow inlet, an outlet for a substantially gas-free, a gas discharge opening, means for generating a vacuum connected to said gas discharge opening, an impeller within said housing and connected thereto a shaft for rotating said impeller, and a suction conduit having a first end connected to said pump inlet and a second end immersed in said liquid below said liquid surface.

2. The system according to claim 1, wherein said liquid source is an open channel flow, said feed inlet is located above said liquid surface and said second end of said suction conduit is immersed in said liquid flow below said liquid surface and below said feed inlet.

3. The system according to claim 2, wherein said degassing pump is located on a dry base alongside said channel.

4. The system according to claim 1, wherein said vacuum generating means is a liquid ring pump connected to said shaft.

5. A method for simultaneously degassing and pumping a flow of gaseous liquid from a gaseous liquid source having a liquid level, comprising:
   placing means for simultaneously pumping and degassing said flow above said level at a second relatively higher level;
   providing said flow from said source at a predetermined pressure;
   pumping with a centrifugal degassing pump said flow from said providing step into said pumping and degassing means;
   separating said flow in said pumping and degassing means into a first substantially gas-free partial flow and a second gas containing partial flow; and
   separately discharging said first and second partial flows from said pumping and degassing means.

6. The method according to claim 5, additionally comprising the step of applying a vacuum to said liquid in said centrifugal pump.

7. The method according to claim 6, wherein said source of said gas containing liquid is an open channel flow.

8. The method according to claim 5, wherein said source of said liquid is at an underpressure.

* * * * *